US00RE42925E

(19) United States
(12) Reissued Patent
Al Ghatta et al.

(10) Patent Number: US RE42,925 E
(45) Date of Reissued Patent: Nov. 15, 2011

(54) POLYESTER RESIN BLENDS WITH HIGH-LEVEL GAS BARRIER PROPERTIES

(75) Inventors: Hussein Al Ghatta, Fiuggi (IT); Sandro Cobror, Naples (IT); Tonino Severini, Colleferro (IT)

(73) Assignee: Cobarr S.p.A, Anagni (IT)

(21) Appl. No.: 12/313,141

(22) Filed: Nov. 17, 2008

Related U.S. Patent Documents

Reissue of:
(64) Patent No.: 6,346,307
Issued: Feb. 12, 2002
Appl. No.: 09/323,000
Filed: Jun. 1, 1999

(30) Foreign Application Priority Data

Jun. 11, 1998 (IT) ..... MI98A1335

(51) Int. Cl.
*B29D 22/00* (2006.01)
*C08G 63/00* (2006.01)
*C08F 283/04* (2006.01)

(52) U.S. Cl. ..... 428/35.7; 428/36.6; 428/36.9; 528/302; 528/308; 528/308.6; 525/425; 525/437; 525/540

(58) Field of Classification Search ..... 428/34.1, 428/34.6, 34.7, 35.2, 35.4, 35.5, 35.7, 36.6, 428/36.7, 36.9, 36.91, 36.92; 528/302, 308, 528/308.6; 525/425, 437, 540
See application file for complete search history.

(56) References Cited

U.S. PATENT DOCUMENTS

| | | | | |
|---|---|---|---|---|
| 4,123,403 | A | 10/1978 | Warner et al. | |
| 4,421,875 | A | 12/1983 | McKee et al. | |
| 4,837,115 | A | 6/1989 | Igarashi et al. | |
| 5,068,136 | A | 11/1991 | Yoshida et al. | |
| 5,250,624 | A | 10/1993 | Teegarden et al. | |
| 5,281,360 | A | 1/1994 | Hong et al. | 252/188.28 |
| 5,300,572 | A | 4/1994 | Tajima et al. | 525/167 |
| 5,866,649 | A | 2/1999 | Hong et al. | 524/538 |
| 5,969,042 | A | 10/1999 | Tiefensee et al. | |
| 5,993,712 | A | 11/1999 | Wandel et al. | |
| 6,288,161 | B1 | 9/2001 | Kim et al. | 524/538 |

FOREIGN PATENT DOCUMENTS

| | | | |
|---|---|---|---|
| DE | 69916174 | T2 | 4/2005 |
| EP | 0039155 | A1 | 4/1981 |
| EP | 0051336 | A1 | 5/1982 |
| EP | 0062901 | A2 | 10/1982 |
| EP | 0 092 979 | | 11/1983 |
| EP | 0398075 | A1 | 5/1990 |
| EP | 0529336 | A1 | 7/1992 |
| EP | 0 752 437 | | 1/1997 |
| EP | 0 819 728 | | 1/1998 |
| EP | 1167447 | B1 | 1/2002 |
| EP | 0964031 | B1 | 7/2004 |
| JP | 6392667 | B2 | 4/1988 |
| JP | 63288993 | A1 | 11/1988 |
| JP | 02135259 | B1 | 5/1990 |
| JP | 06106614 | A | 4/1994 |
| JP | 08183092 | B2 | 7/1996 |
| JP | H10-7893 | | 1/1998 |
| WO | 9320147 | A1 | 10/1993 |
| WO | WO 93 20147 | | 10/1993 |
| WO | 9409069 | A1 | 4/1994 |
| WO | WO 94 09069 | | 4/1994 |
| WO | 9511801 | A1 | 5/1995 |
| WO | 9705198 | A1 | 2/1997 |

OTHER PUBLICATIONS

Yoshitsugu Maruhashi and Setsuko Iida, "Transparency of Polymer Blends," Polymer Engineering and Science, Nov. 2001, vol. 41, No. 11, pp. 1987-1995.
Schwabe, Sandmair, Marx, "Partial Nullity Action on behalf of Alpla Werke", and Hoffmann Eitle "Translation of the relevant parts of Partial Nullity Action on behalf of Alpla Werke", Apr. 24, 2009, the whole document.
Boehmert & Boehmert, Hoffmann Eitle "Translation of Nullity Action by Boehmert & Boehmert", Mar. 25, 2009, Includes exhibits which are not patents or NPL documents disclosed elsewhere.
Kirk-Othmer, "Encyclopedia of Chemical Technology, 4th Edition", 1996, vol. 19, pp. 618-621, Exhibit K1 of Schwabe brief.
"The Wiley Encyclopedia of Packaging Technology", 1986, pp. 512-515, Exhibit K6 of Schwabe brief.
BP Amoco Chemical Co, "Environmental Assessment for Food Additive Petition Terephthalate-Isophthalate Polymers", Sep. 14, 1999, Published in: USA, Exhibit K3 of Schwabe brief.
EPO, "Communication to Sinco Ricerche S.p.A.", Jul. 22, 2002, Exhibit K13 of Schwabe brief.
Dr.-Ing. Bauer, "Letter to Alpla Hard Technical Center and Hoffmann Eitle"Translation of Declaration to Alpla Hard Technical Center, Feb. 26, 2009, Exibit K10a of Schwabe brief.
"Declaration in lieu of oath by Stefan C. Swallart", Mar. 2, 2009 and Hoffmann Eitle, "Translation of declaration in lieu of oath by Stefan C. Swallart", Exhibit K10b of Schwabe brief.
Wallan (Dupont), "Letter to Valspar Corporation", Mar. 11, 2009, Exhibit K10d of Schwabe brief.
"Wikipedia, Polyethylene Terephthalate", http://en.wikipedia.org/wili/Polyethylene_terephthalate, Nov. 21, 2008, six pages, Exhibit K6 of Schwabe brief.
Dupont, "Selar PT Polyesters for Packaging Applications", Oct. 3, 1992, and Hoffmann Eitle Translation Exhibit K10c of Schwabe brief.
Aspy, Paul, "Modern Plastics", "Crystallization control of PET Copolyesters", , pp. 74-76, Volume AUG, No. 1983, Published in: USA, Exhibit K2 of Schwabe brief.
M&G, "M&G Website", 2009; http://www.gruppomg.com/pag.php?mi=200&mod=userpage&pI=1077 and http://www,gruppomg.com/history.php?mi=201, Exhibit K4 of Schwabe brief.

(Continued)

*Primary Examiner* — Walter B Aughenbaugh
(74) *Attorney, Agent, or Firm* — Alvin T. Rockhill; Edwin A. Sisson

(57) ABSTRACT

Compositions comprising a polyester resin and a polyamide derived from a dicarboxylic acid with 6-22 carbon atoms and from m-xylylene diamine having high-level gas barrier properties, obtained by mixing in the melted state the polyester resin premixed with a dianhydride of a tetracarboxylic acid and the polyamide, operating under conditions such as to render the polymeric components [theologically] *rheologically* compatible *with* each other. The compositions are suitable for preparing containers and biaxially-orientated films.

51 Claims, No Drawings

OTHER PUBLICATIONS

Karayannidis et al., "Journal of Applied Polymer Science", "Thermal Behavior and Tensile Properties of Poly(ethylene terephthalate-co-ethylene isophthalate)", Dec. 16, 1999, pp. 200-207, vol. 78, Exhibit K10f of Schwabe brief.
Judgment as issued by the Federal Patent Court and pronounced on Feb. 8, 2011 (Document in German).
Translation of Judgment as issued by the Federal Patent Court and pronounced on Feb. 8, 2011.
Schwabe, Sandmair, Marx, "Nullity Action against the German Pat, 699 16 174, of European Patent 0 964 031," Jul. 5, 2010, on behalf of Alpla Werke and Hoffmann Elite English translation pp. 1-36; references exhibits K16-K34 described on p. 36, addressed in accompanying document with this submission to the USPTO.
Scrivia., "Average Size of the Dispersed Domains in the Injection Molded Portion of Carpe Diem Bottles," Test Report From PROPLAST, Oct. 21, 2008, Exhibit K17 (Original English and German Translation) and K17a (8 pgs) (domain measurements) of Schwabe brief. K16 is not submitted with this IDS as it is merely digital images of the photographs used to print the pictures.
Dr. Stena Kettl, Ph.D., "Statistische Analyse der mittleren Grosse der dispergierten Domanen in PET-Flaschen," Sep. 29, 2008, Exhibit K 18 of Schwabe brief, Original English Version Included, 17 pgs.
Hoffmann Eitle, "*Cobarr S.P.A.* v. *Alpa Werke*," Domain measurements, Jan. 25, 2010, Exhibit K 19 of Schwabe brief, 15 pgs.
Hoffmann Eitle, "*Cobarr S.P.A.* v. *Alpa Werke*," Domain measurements, Jan. 25, 2010, Exhibit K 20 of Schwabe brief, 10 pgs.
Hoffmann Eitle, "*Cobarr S.P.A.* v. *Alpa Werke*," Domain measurements, Jan. 28, 2010, Exhibit K 21 of Schwabe brief, 14 pgs.
Hoffmann Eitle, "*Cobarr S.P.A.* v. *Alpa Werke*," Domain measurements, Jan. 28, 2010, Exhibit K 22 of Schwabe brief, 9 pgs.
"Declaration by Prof Hatsuo Ishida," Case Western University, Cleveland, Jan. 8, 2010, Exhibit K 23 of Schwabe brief, 68 total pages, 9 pages of English Declaration, 9 pgs of German Translation from Hoffmann Eitle, and pp. 457-506 from White et al, Advances in SEM of Polymers, Rubber Chemistry and Technology vol. 57 (1984).
Dr. Thiele, "Gutachten," Nov. 16, 2009, Exhibit K 24 of Schwabe brief,8pgs Eng Translation. includes 5 pgs of ASTM D 3576-98, Standard Test Method for Cell Size of Rigid Cellular Plastics, Jan. 1999 and DE 197 07 447 to Thiele.et al. (Zimmer). Corresponds to US 5993712 cited in this submission. See claim 2 and col. 7, lines 11-22 for technique to determine domain distirbution of on polymer dispersed in another.
Scantlebury, Geoffrey, "Declaration of Geoffrey R. Scantlebury," Jun. 24, 2010, Exhibit K 25 of Schwabe brief, regarding the examination of raw data of the infringement case.
Bundle of Exhibits: Excerpt from Wikipedia with regard to the key word: "average"; excerpt from Dr. Ing.. Richard Erns "Worterbuch der industriellen Technik", vol. 1, Oscor Brandstetter, as published in Berlag AG, Weisbaden 1974 regardin the key word "average"—Exhibit K26 of Swchabe brief.
Scantlebury, Geoffrey, "Declaration of Geoffrey R. Scantlebury," Jan. 8, 2010, Exhibit K 28 of Schwabe brief, Mr. Scantlebury argues that the word average means D50 and not arithmetic mean pointing to prior art EP 0051336, EP0062901 (, EP0842222 and US 4123403—however by his own description on point 12, none of this art discloses nylon dispersed in polyester.
Scantlebury, Geoffrey, "Erklarung von Geoffrey R. Scantlebury," Jan. 8, 2010, Exhibit K 29 of Schwabe brief, is the German Translation of Exhibit 28 above, IDS entry 13. Note: exhibits 30-32 are patent literature.
Limpert, Stahel & ABBT, "Log-normal Distributions Across the Sciences: Keys and Clues," BioScience, vol. 51, No. 5, May 2001, Exhibit K 33 of Schwabe brief.
ISO, "Representation of results of particle size analysis, Part 5: Methods of calculation relating to particle size analyses using logarithmic normal probability distribution," First edition, Aug. 1, 2005, Exhibit K 34 of Schwabe brief.
Schwabe, Sandmair, Marx, "Nullity Action against the German Pat, 699 16 174, of European Patent 0 964 031," Jan. 19, 2011, on behalf of Alpla Werke and Hoffmann Elite English translation 21 pgs; references new exhibits K35-K43 described on p. 21.
Fraunhofer Institute for Applied Polymer Research dated Oct. 26, 2010 Exhibit K 35, in German, English translation provided. This document is to rebut the accuracy of the Proplast report (K17) establishing infringement.
Schwabe, Sandmair, Marx, Brief dated Oct. 28, 2010 in the parallel infringement appeal proceedings, Exhibit K 36, in German, English translation provided. Cites WO 95/11801, JP 8-183092, JP 63-92667 as destroying novelty. This art was already produced for review as items 9, 6, and 8 respectively in the IDS dated Jul. 28, 2009.
Fraunhofer Institute for Applied Polymer Research dated Jan. 18, 2011 "Examination of the etching behaviour of PET bottles", Exhibit K 37, English Translation Provided as SH2, IDS item 29.
Exhibit K 38 is EP 1 167 447, see above, (in foreign patent documents section).
"Atomic force microscopic study on blend morphology and clay dispersion in polyamide-6 / polypropylene / organo clay systems", Journal of Polymer Science, Part B: Polymer Physics, 43, 1198-1204 (2005), Exhibit K 39.
"Manipulating the phase morphology in PPS / PA6 blends using clay", Journal of Applied Polymer Science, 106, 2238-250 (2007), Exhibit K 40.
"Improvement in gas permeability of biaxially stretched PET film blended with high barrier polymers: The role of chemistry and processing conditions." European Polymer Journal, 46,226-237 (2010), Note: declaration from Author Dr. Cakmak added by Applicants.
Statement of Dr. Scantlebury dated Jan. 18, 2011, Exhibit K 42.
"DAK Americas Sample Summary Report", Exhibit K 43, Dec. 16, 2010.
Fraunhofer Institute for Applied Polymer Research dated Jan. 18, 2011 "Examination of the etching behaviour of PET bottles", Exhibit SH 2, English Translation Provided 8pgs. Report is same as that submitted by Shwabae, K 37, IDS item 20.
Pictures of domains from DE 7 (Infringement Suit). Exact Same submission as Schwabe, K21 entered as IDS 6, see item 6 of this IDS.
Dr. Thiele, "Gutachten," Nov. 16, 2009, Exhibit SH 4, Already entered as Exhibit 24 of Schwabe brief,However, this submission only contained the declaration report and did not contain the patent or the ASTM standard. 8pgs Eng Translation. This Copy is not Submitted as it has already been submitted as a different entry.
Scrivia., "Average Size of the Dispersed Domains in the Injection Molded Portion of Carpe Diem Bottles," Test Report From Proplast, Oct. 21, 2008, Exhibit SH 5. This only contains the first 41 pages of the report submitted as Schwabe K17, IDS item 2. To avoid Duplication, nothing is submitted as SH 5, IDS Item 32 as it is already submitted elsewhere.
Hoffmann Eitle, "*Cobarr S.P.A.* v. *Alpa Werke*," Domain measurements, Jan. 25, 2010, SH 6 and Exhibit K 19 of Schwabe brief, 16 pgs. Note: because the files differ by 1 page, the whole of SH 6 is being submitted.
Fraunhofer, "Test Report Regarding Pore Distribution in injection molding of a polyethylene terephthalate—polyamide composite." Jan. 17, 2001. 2 pages. Exhibit SH 7. The document purports to be a rework of Example in Table 3 of WO 95/11801. The rework is not even a close comparison to establish an inherent disclosure. See attached comparison establishing inability to recreate a working example.
Declaration of Geoffrey R. Scantlebury, #2, Re: EP 0 964 031, Exhibit SH 9, 8 pgs. Purports to be another rework but is not a valid comparison, see explanation on submission sheet.
Declaration of Geoffrey R. Scantlebury, #1, Re: EP 0 964 031, Exhibit SH 10, 6 pgs, Jan. 14, 2011.
Paul and Bucknall, Polymer Blends, 2000, pp. 369-371. Exhibit SH 11, copyright 2000.
Declaration # 1 of Delane Nagel Richardson, Feb. 1, 2011, 3 pages.
Declaration of Dr. Mukerrem Cakmak, Feb. 2, 2011, 4 pages.
Declaration of Arianna Giovannini, Apr. 11, 2010, 2 pages, notes imaging software has smaller reading than hand measurements (pts 9-11) .
Klusmann, Hoffmann—Eitle submission brief to Federal Patent Court Dec. 27, 2010. 17 pgs.
MGC, Nylon MXD6 Grades and Uses, 2 pgs, copyright 2007.

Chemical Abstracts, vol. 113, No. 25, Dec. 17, 1990—Columbus, Ohio, US; abstract No. 232752, XP002126791 *abstract* & JP 01 272660 A (Ube Ind., Ltd.) Oct. 31, 1989.

Database WPI, Section Ch, Week 198603, Derwent Publications Ltd., London, GB; AN 1986-017548—XP002126792 & JP 60 240452 A (Mitsui Petrochem Ind Co Ltd), Nov. 29, 1985 *abstract*.

POLYESTER RESIN BLENDS WITH HIGH-LEVEL GAS BARRIER PROPERTIES

Matter enclosed in heavy brackets [ ] appears in the original patent but forms no part of this reissue specification; matter printed in italics indicates the additions made by reissue.

The present invention relates to biaxially-oriented films and containers provided with high resistance to gas permeability, and to the polymeric materials used to prepare said containers and films. *This invention more specifically relates to articles made of or comprising a material obtained from compositions comprising a polyester resin and a polyamide wherein they have an oxygen permeability of less than 0.065 ml/bottle/day/atm, measured on a 1.5-liter bottle with a thickness of 225 microns obtained by injection blow molding.*

BACKGROUND OF THE INVENTION

Aromatic polyester resins are used in ever-increasing amounts in the production of beverage containers and films.

The barrier properties of aromatic polyester resins are rather limited. In the case of containers for carbonated beverages prepared from said resins, the possibility to preserve the beverages for a sufficiently long time is uncertain.

Polyamide resins have remarkable mechanical properties, but they have the drawback that they have a high moisture absorption which reduces their properties.

Polyamide resins are normally used mixed with aromatic polyester resins in order to improve the mechanical characteristics of the latter. The presence of polyester resin in the mix reduces the moisture-absorbing tendency of polyamide resins.

Mixing the resins, however, is difficult because of their poor compatibility in the melted state.

In order to obtain better mechanical properties and to avoid peeling in products, it has been suggested to mix the resins in the extruder in the presence of a dianhydride of a tetracarboxylic acid (JP 1-272660 Kokai).

Pyromellitic anhydride is the preferred compound.

The mechanical properties of the resulting mixtures can be improved further by subjecting the mixtures to a solid-state polycondensation treatment (WO 94/09069).

Among polyamides, the most commonly used polyamides, such as nylon 6 and 66, have slightly better gas barrier properties than polyester resins such as polyethylene terephthalate (PET) and copolyethylene terephthalates such as polyethylene terephthalate (PET) and copolyethylene terephthalates containing small proportions of units derived from isophthalic acid.

However, a polyamide obtained from m-xylylene diamine and adipic acid (poly-m-xylylene adipamide, poly MXD-6) is known as having considerable gas barrier properties (in relation to oxygen and carbon dioxide) which are distinctly better than those of polyethylene terephthalate.

This polyamide is used in mixture (obtained in an extruder) with PET or COPET in order to improve their barrier properties.

The oxygen permeability of a 1.5-liter PET bottle (produced by injection blow-molding) is reduced by approximately 50% when the bottle is obtained from a mixture which contains 16% by weight of polyamide and by approximately 20% when it contains 7% polyamide by weight.

The barrier properties of the 16% polyamide mixture are similar to those of a bottle formed of a two-layer film, one layer being PET and the other one being polyamide.

BRIEF DESCRIPTION OF THE INVENTION

It has now been found unexpectedly that it is possible to remarkably improve the barrier properties of biaxially-oriented films and containers which can be obtained from polyester resins used in a mixture with a polyamide such as poly MXD-6 if the polyester resin is first mixed in the melted state with a dianhydride of a tetracarboxylic acid and the resulting mixture is further mixed, again in the melted state, with a polyamide such as poly MXD-6, working under temperature and shear forces conditions and with viscosities of the melted polymeric components such as to render the polymeric components of the mixture compatible from the rheological viewpoint. The dianhydride is mixed with the polyester resin in an amount from 0.01 to 3% by weight.

DETAILED DESCRIPTION OF THE INVENTION

Pyromellitic dianhydride is preferred. Other dianhydrides that can be used are dianhydrides of 1,2,3,4-cyclobutane tetracarboxylic acid, 3,3':4,4'-benzophenone tetracarboxylic acid, 2,2 bis-(2,4-dicarboxyphenyl)ether. The dianhydrides of aromatic tetracarboxylic acids are preferred.

Preferably, the polyester resin is a copolyethylene terephthalate in which up to 25%, preferably 1 to 15%, of the units derived from terephthalic acid are substituted by units or sequences derived from isophthalic acid or from mixtures thereof with naphthalene dicarboxylic acids.

The polyamide is preferably poly MXD-6. Other polyamides that can be used are those obtainable from an aliphatic dicarboxylic acid other than adipic acid containing 6 to 22 atoms of carbon and an arilene diamine, preferably m-xylylene diamine.

Said dicarboxylic acid is preferably suberic, sebacic and dodecanoic acid.

Polyamides with crystallization rates similar to those of polyester are preferably used.

The numeral molecular weight of the starting polyamide is generally between 8000 and 50000.

The terminal-$NH_2$ groups of the starting polyamide can be reacted with epoxy compounds in order to increase its dispersion in the polyester matrix. Epikote from the Shell Italia is an example of usable epoxi compounds.

Preferably, the polyamide is used in an amount equal to 5 to 30% by weight on the mixture. Larger amounts can be used depending on the final properties of the mixture.

It is in fact possible, and it is another aspect of the invention, to prepare, operating according to the method of the invention, mixtures having a polyamide content of more than 50% by weight and up to 80-90% by weight which can be used as master batch.

A preferred mixing process consists in extruding the polyester resin with the addition of the dianhydride and in subsequently extruding the mixture with the addition of the polyamide.

It is possible to work in a single stage by premixing in the extruder the polyester and dianhydride first and then adding the polyamide in the extruder.

In order to achieve good compatibilization among the polymeric components, their viscosities in the melted state has to be very similar.

Preferably, the ratio between the viscosity of the polyester and the viscosity of the polyamide is between 0.2:1 and 4:1.

Operating under the above conditions it is possible to obtain compositions wherein the polyamide is dispersed in the polyester matrix with domains having size of less than 1 micron, preferably in the range from 0.2 to 0.4 micron. The microstructure was obtained by scanning electron microscope (S.E.M.) of the fracture surface of injection molded small bars treated with formic acid to extract the polyamide. The bars obtained according to example 1 have a microstructure wherein the dispersed phase has a size of less than 0.5 micron. The size of the domains in the bars obtained from example 1 but without using PMDA are higher than 1.5 micron as average. The microstructure according to the invention is characteristic in particular of the blends of poly MXD-6 with PET or copolyethylene thereftalates containing up to 25% of units deriving from [isophtalic] *isophthalic* acid.

It is surprising that when working under the mixing conditions according to the invention it is possible to obtain materials having gas barrier properties (relative to $O_2$ and $CO_2$) which are far higher than those obtainable by mixing the polyester resin and the polyamide in the absence of the dianhydride of tetracarboxylic acid or by mixing the three components of the mixture simultaneously or by first mixing the polyamide with the dianhydride and then adding the polyester resin.

Oxygen permeability in 1.5-liter bottles with an average thickness of 225 microns can be reduced of 4 or more times and $CO_2$ permeability can be reduced by 2 or more times as a function of the content of the polyamide (pMXD-6).

The polyester resin is obtained by polycondensation (according to known methods) of terephthalic acid or lower diesters thereof with a diol with 2-12 carbon atoms, such as for example ethylene glycol, 1,4-butanediol and 1,4-cyclohexane dimethylol. The copolyethylene terephthalate is, as mentioned, the preferred resin for preparing containers.

The polyethylene terephthalate homopolymer can be conveniently used in the preparation of biaxially-oriented films.

The starting polyester resin used in the preparation of the compositions according to the invention has an intrinsic viscosity of 0.3 to 0.8 dl/g. The initial viscosity can be increased by subjecting the resin, premixed with the dianhydride of the tetracarboxylic acid or the mixture containing the polyester resin, the polyamide and the dianhydride, to a solid-state polycondensation treatment at temperatures between approximately 150 and 230° C. for a time and at temperature conditions sufficient to increase by at least 0.1 units the viscosity of the polyester resin.

Since the polyester resin is difficult to separate by solvent extraction in the mixture, the increase in intrinsic viscosity of the polyester resin in the mixture is considered similar to the increase in the polyester resin when it is treated alone in the same temperature and duration conditions to which the mixture has been subjected.

The solid-state polycondensation treatment, in addition to leading to an increase in the intrinsic viscosity of the polyester resin, allows to improve the mechanical properties of the compositions, particularly impact resistance.

The treatment applied to the polyester resin added of the dianhydride of the tetracarboxylic acid allows to bring the viscosity of the resin in the melted state to values which are similar to those of the polyamide resin, particularly when the initial polyester resin has relatively low intrinsic viscosity values.

The mixing of the polyester with the dianhydride and then with the polyamide is performed in a single- or twin-screw extruder. Contrarotating and intermeshing twin-screw extruders are preferred, using residence times of generally less than 180 seconds and working at temperatures above the melting temperatures of the polymeric components, generally between 200° and 300° C.

The biaxially oriented films and containers are prepared according to known methods. For example, bottles for beverages are prepared by injection-stretch blow molding; biaxially oriented films are prepared with the double-bubble method or by cast-extrusion followed by biaxial stretching.

The material according to the invention can also be used to prepare multilayer films comprising, as a core layer, a biaxially oriented film obtained from the material according to the invention.

Another application of the blends according to the invention, wherein the polyester resin is a copolyethylene [therephthalate] *terephthalate* with 10% or more of units from isophthalic acid resides in the preparation by free blowing of preforms of high capacity pouches (51, or more) suitable for being filled with liquids such as soft drinks or others.

The pouches have high clarity and good mechanical properties. They can be easily folded without breakage or stress withening problems.

The intrinsic viscosity is measured in solutions of 0.5 g of resin in 100 ml of 60/40 solution by weight of phenol and tetrachloroethane, at 25° C. according to ASTM standard D 4603-86.

The measurement of the melt viscosity is performed with a Goettfert rheometer equipped with a 2-mm capillary tube, working at 280° C. with a shear rate of 100 $sec^{-1}$.

EXAMPLES

The following examples are given to illustrate but not to limit the invention.

Example 1

20 kg/h of crystallized granules of copolyethylene terephthalate (COPET) containing 4.5% isophthalic acid (IPA) with IV=0.6 dl/g (predried at 140° C. in vacuum for at least 12 h) are fed together with 20 g/h of pyromellitic dianhydride (PMDA) (0.1% by weight on the COPET) in a twin-screw extruder with contrarotating and intermeshing screws and then pelletized.

The operating conditions are:

Screw rotation rate: 100 rpm

Cylinder temperature: 280° C. throughout the cylinder

COPET feed: 20 kg/h

PMDA feed: 20 g/h

Residence time: 1.5 min.

The resulting pellets were crystallized at 130° C. in a reactor in continuous under nitrogen flow.

IV after extrusion was 0.61 dl/g.

20 kg/h of crystallized COPET containing 0.1% PMDA obtained as mentioned above are fed into a twin-screw extruder provided with contrarotating and intermeshing screws together with 2.2 kg/h of poly-MXD-6 (Mitsubishi Gas Chemical-MGC-Japan) having a viscosity in the molten state at 280° C. and 100 $sec^{-1}$ of shear rate of 1000 PAS and pelletized.

The conditions for preparing the mixture are the same used for the treatment of COPET with the addition of PMDA.

Example 2

Preparation of the mixture of COPET and PMDA of example 1 is repeated, the only difference being that COPET with 4.5% isophthalic acid is replaced with a mixture containing 92/8 by weight of COPET with 2% isophthalic acid, IV=0.8 dl/g and 8% polyethylene isophthalate.

The IV of the pellets was 0.81 dl/g. The pellets are crystallized at 130° C. in a reactor operating continuously in nitrogen.

The pellets are then extruded together with 10% by weight of poly MXD-6 in the conditions of example 1.

Example 3

The preparation of example 1 (premixing of COPET with PMDA and subsequent extrusion with 10% poly MXD-6) was repeated, with the only difference that the COPET used contained 2% isophthalic acid and had an IV of 0.6 dl/g.

Example 4

The preparation of example 1 was repeated, with the only difference that the mixture contained 70% by weight of poly-MXD-6.

Example 5

A composition, prepared according to example 1, by using in place of COPET containing 4.5% IPA a mixture containing 86% by weight of COPET with 2% of IPA (IV=0.8 dl/g) and 14% of polyethylene isophthalate, and in which the percentage of poly-MXD was 7.5% by weight, was used to prepare 40 g preforms.

The preforms were submitted to free blowing using a Sidel machine equipped with an infrared heater to heat the preforms to 110°. The preforms were blown using air at 3 bar pressure. The obtained pouches have a capacity of 5 l. and are highly clear. They can be folded (when empty) and refilled with liquids.

The pouches filled with 5 l. water can withstand a drop impact of 1 m.

Examples 6,7

The mixtures obtained according to examples 1-4 were used to produce 36-g preforms using a Husky injection unit.

The preforms were then blown in a 1.5- and 2-liter cavity to produce bottles by stretch-blow molding. The thickness of the 1.5-liter bottles was 225 microns (average value) and the thickness of the 2-liter bottles was 195 microns (average value).

The permeability characteristics of the bottles with respect to $O_2$ and $CO_2$ are listed in table 1. Gas permeability was measured at 18° C., 40% RH, using Mocon instruments.

Comparison Example 1

The preparation of example 1 was repeated, the only difference being that a mixture with 90/10 by weight of COPET (containing 2% IPA, with IV=0.8 dl/g) and of poly MXD-6, not containing PMDA, was extruded.

1.5-liter bottles were prepared by injection-blow molding in the conditions used in examples 6-7.

The permeability to $O_2$ and $CO_2$ of the bottles was much higher than in the bottles of examples 6-7.

Comparison Example 2

1.5-liter bottles were prepared in the conditions of examples 6-7, using a resin formed by COPET with 2% IPA and IV=0.8 dl/g.

The data on $O_2$ and $CO_2$ permeability are listed in table 1. The disclosures in Italian Patent Application No. MI98 A001335 from which this application claims priority are incorporated herein by reference.

*TABLE 1*

| | *Mixtures* | | | | |
|---|---|---|---|---|---|
| | *Comparison 2* | *Example 1* | *Example 2* | *Example 3* | *Example 4* |
| *% weight pMXD-6* | *0* | *10* | *10* | *10* | *70* |
| *% IPA* | *2* | *4.5* | *10* | *2* | *4.5* |
| *$O_2$ permeability* | | | | | |
| *1.5-liter bottles ml/bott/d/atm* | *0.53* | *0.13* | *0.1* | *0.12* | |
| *2 liter bottles* | *0.62* | *0.23* | *0.14* | *0.14* | |
| *$CO_2$ permeability 1.5-liter bottles ml/bott/d/atm* | *18.2* | *7.25* | *5.31* | *7.02* | *2.7* |
| *Improvement % $O_2$ permeability* | | | | | |
| *1.5-liter bottles* | | *407* | *550* | *449* | |
| *2-liter bottles* | | *362* | *578* | *567* | |
| *$CO_2$ permeability 1-5-liter bottles* | | *251* | *343* | *250* | *670* |

What is claimed is:

1. A biaxially-oriented article selected from the group consisting of biaxially-oriented films and containers formed by using a material obtained by mixing a melted substance comprising:

a) an aromatic polyester, premixed with a dianhydride of a tetracarboxylic acid in an amount from 0.01 to 3% by weight;

b) a polyamide derived from m-xylylene diamine and from a dicarboxylic acid with 6-22 carbon atoms in an amount from 2 to 50% by weight on the sum of a)+b), wherein the polyamide is dispensed in the polyester in domains with an average size lower than 1 micron.

2. Containers according to claim 1, in the form of bottles for carbonated beverages.

3. Containers according to claim 1, obtained by injection blow-molding.

4. Containers according to claim 1, wherein the aromatic polyester is copolyethylene terephthalate containing up to 25% by weight units or sequences derived from isophthalic acid.

5. Article according to claim 1, wherein the polyamide is poly m-xylylene adipamide.

6. Article according to claim 1, wherein the dianhydride of the tetracarboxylic acid is pyromellitic dianhydride.

7. Article according to claim 1, wherein the starting polyester of the material used to prepare the container has an intrinsic viscosity from 0.3 to 0.8 dl/g.

8. Article according to claim 1, wherein the material obtained from the melted mixture comprising the polyester, the polyamide and the dianhydride is subjected to solid-state polycondensation for a time and temperature conditions sufficient to increase the intrinsic viscosity of the polyester by at least 0.1 units.

9. Article according to claim 1, wherein the polyester premixed with the dianhydride is subjected to a solid-state polycondensation treatment thereby the intrinsic viscosity of the initial polyester is increased by 0.1 units.

10. Article according to claim 1, wherein the melt viscosities of the polyester and the polyamide, determined at the mixing temperature, are in a ratio from 0.2:1 to 4:1.

11. Article according to claim 1, wherein the mixing of the components is performed in the extruder.

[12. Article made of or comprising a material obtained from compositions comprising a polyester resin and a polyamide wherein they have an oxygen permeability of less than 0.065 ml/bottle/day/atm, measured on a 1.5-liter bottle with a thickness of 225 microns obtained by injection blow molding.]

13. Films according to claim 5, obtained by biaxial stretching of films prepared by cast-extrusion.

14. Films according to claim 1, obtained by blow-molding using the double-bubble method.

15. A polymeric material usable for preparing articles selected from the groups consisting of biaxially-oriented films and containers having high characteristics of resistance to [gas] $CO_2$ permeability *of less than 7.25 ml/bottle/d/atm, as measured on a 1.5 liter bottle having an average thickness of 225 microns*, obtained by mixing a melted material, comprising:

a) an aromatic polyester resin, premixed with a dianhydride of a tetracarboxylic acid, in an amount between 0.01 and 3% by weight;

b) a polyamide derived from m-xylylene diamine and from a dicarboxylic acid with 6-22 carbon atoms wherein the polyamide is dispensed in the polyester in domains with an average size lower than 1 micron.

16. A material according to claim 15, wherein the polyester resin is copolyethylene terephthalate containing up to 25% by weight of units derived from isophthalic acid.

17. A material according to claim 15, wherein the polyamide is poly m-xylylene adipamide.

18. A polymeric material according to claim 15, wherein the dianhydride is pyromellitic dianhydride.

19. A polymeric material according to claim 15, wherein the material obtained from the melted mixture comprising the components a), b) and c) is subjected to solid-state polycondensation until the intrinsic viscosity of the starting polyester is increased of at least 0.1 units.

20. A polymeric material according to claim 19, wherein the polyester premixed with the dianhydride is subjected to solid-state polycondensation until the intrinsic viscosity of the initial polyester is increased of at least 0.1 units.

21. A polymeric material according to claim 15, wherein the polyester and the polyamide have melt viscosities, at the mixing temperature, in a ratio from 0.2:1 to 4:1.

[22. Containers whose resistance to oxygen permeability is less than 0.065 ml/bottle/day/atm, measured on a 1.5-liter bottle with a thickness of 225 microns prepared by injection-blow molding obtained from the polymeric material of claim 15.]

23. A polymeric material comprising an aromatic polyester resin and a, poly-m-xylylene adipamide wherein the poly-m-xylylene adipamide is dispersed in a polyester resin matrix in domains with average size from 0.2 to 0.4 micron.

24. A polymeric material according to claim 23 wherein the polyester resin is a copolyethylene terephthalate containing up to 25% by weight of units derived from isophthalic acid and the polyamide is poly-m-xylylene adipamide.

[25. Films according to claim 12 obtained by biaxial stretching of films prepared by cast-extrusion.]

*26. A polymeric material according to claim 23 wherein the polyester resin is a copolyethylene terephthalate containing 1% to 15% by weight units derived from isophthalic acid and wherein the polyamide is poly-m-xylylene adipamide.*

*27. A polymeric material according to claim 23 which is further comprised of pyromellitic dianhydride.*

*28. A polymeric material according to claim 26 which is further comprised of pyromellitic dianhydride.*

*29. A polymeric material according to claim 23 wherein the polymeric material is in the form of a preform.*

*30. A polymeric material according to claim 24 wherein the polymeric material is in the form of a preform.*

*31. A polymeric material according to claim 26 wherein the polymeric material is in the form of a preform.*

*32. A container which is made from the polymeric material specified in claim 23.*

*33. A container which is made from the polymeric material specified in claim 24.*

*34. A container which is made from the polymeric material specified in claim 26.*

*35. A container which is made from the preform specified in claim 29.*

*36. A container which is made from the preform specified in claim 30.*

*37. A container which is made from the preform specified in claim 31.*

*38. A container as specified in claim 32 wherein the container is made by injection-blow molding.*

*39. A container as specified in claim 33 wherein the container is made by injection-blow molding.*

*40. A container as specified in claim 34 wherein the container is made by injection-blow molding.*

*41. A bottle which is made from the polymeric material specified in claim 23.*

*42. A bottle which is made from the polymeric material specified in claim 24.*

*43. A bottle which is made from the polymeric material specified in claim 26.*

*44. A bottle made from the preform specified in claim 29.*

*45. A bottle made from the preform specified in claim 30.*

*46. A bottle made from the preform specified in claim 31.*

*47. A bottle as specified in claim 41 wherein the bottle is made by injection-blow molding.*

*48. A bottle as specified in claim 42 wherein the bottle is made by injection-blow molding.*

*49. A bottle as specified in claim 43 wherein the bottle is made by injection-blow molding.*

*50. A bottle as specified in claim 44 wherein the bottle is made by injection-blow molding.*

*51. A bottle as specified in claim 45 wherein the bottle is made by injection-blow molding.*

*52. A bottle as specified in claim 46 wherein the bottle is made by injection-blow molding.*

*53. A bottle as specified in claim 47 wherein said bottle has a $CO_2$ permeability of less than 7.25 ml/bottle/d/atm, as measured on a 1.5 liter bottle having an average thickness of 225 microns.*

*54. A bottle as specified in claim 52 wherein said bottle has a $CO_2$ permeability of less than 7.25 ml/bottle/d/atm, as measured on a 1.5 liter bottle having an average thickness of 225 microns.*

* * * * *